United States Patent
Graff et al.

(10) Patent No.: US 10,271,693 B2
(45) Date of Patent: Apr. 30, 2019

(54) METHOD OF MAKING A COMPACT ROLL OF ABSORBENT PAPER

(71) Applicant: SCA Tissue France, Saint-Ouen (FR)

(72) Inventors: Pierre Graff, Wolfgantzen (FR);
Gerald Duhen, Andolsheim (FR);
Donald Barredo, Ingersheim (FR);
Pierre Probst, Ammerschwihr (FR);
Pascale Saas, Selestat (FR)

(73) Assignee: ESSITY OPERATIONS FRANCE, Saint-Ouen (FR)

( * ) Notice: Subject to any disclaimer, the term of this patent is extended or adjusted under 35 U.S.C. 154(b) by 0 days.

(21) Appl. No.: 15/164,186

(22) Filed: May 25, 2016

(65) Prior Publication Data

US 2016/0262579 A1    Sep. 15, 2016

Related U.S. Application Data

(62) Division of application No. 14/126,136, filed as application No. PCT/EP2012/061522 on Jun. 15, 2012, now Pat. No. 9,375,116.

(30) Foreign Application Priority Data

Jun. 15, 2011 (FR) ...................... 11 55244

(51) Int. Cl.
*A47K 10/16* (2006.01)
*B31F 1/07* (2006.01)
*B32B 37/02* (2006.01)
*A47K 10/32* (2006.01)

(52) U.S. Cl.
CPC ................ *A47K 10/16* (2013.01); *B31F 1/07* (2013.01); *B32B 37/02* (2013.01); *A47K 2010/3266* (2013.01); *Y10T 156/1016* (2015.01)

(58) Field of Classification Search
CPC ......................................... B31F 1/07
See application file for complete search history.

(56) References Cited

U.S. PATENT DOCUMENTS 3,650,882 A * 3/1972 Thomas ................. A47K 10/16
156/209
3,738,905 A    6/1973 Thomas
(Continued)

FOREIGN PATENT DOCUMENTS

EP          1391174 A1     2/2004
GB          2376436 A  * 12/2002  ............... B31F 1/07
WO     WO-02/40260 A2     5/2002

*Primary Examiner* — Barbara J Musser
(74) *Attorney, Agent, or Firm* — Drinker Biddle & Reath LLP

(57) ABSTRACT

A roll of wiping paper is obtained by winding a sheet of multi-ply absorbent paper around a core. The sheet includes at least a first and a second ply of absorbent paper, each with a grammage of between 15 and 30 g/m² and at least one of the plies incorporating a wet strength additive. The thickness of the sheet Ep being between 0.02 and 0.07 cm, the diameter of the core being less than 3.5 cm, the diameter of the roll being between 4.5 cm and 11 cm for a volume V of absorbent paper per unit length of the roll, and the absorbency A of the sheet in cm³ of water per gram of paper being greater than 6 cm³/g. The ratio E=A/(Ep*V) of the roll is greater than or equal to 3.2.

12 Claims, 2 Drawing Sheets

(56) References Cited

U.S. PATENT DOCUMENTS

| | | | |
|---|---|---|---|
| 6,578,617 B1* | 6/2003 | Biagiotti | B31F 1/07 156/209 |
| 2003/0021953 A1* | 1/2003 | Graff | B31F 1/07 428/153 |
| 2004/0038006 A1* | 2/2004 | Biagiotti | B31F 1/07 428/172 |
| 2004/0074594 A1 | 4/2004 | Basler et al. | |
| 2008/0149286 A1 | 6/2008 | Horenziak et al. | |
| 2009/0162597 A1* | 6/2009 | Barredo | A47K 10/16 428/57 |

* cited by examiner

METHOD OF MAKING A COMPACT ROLL OF ABSORBENT PAPER

CROSS-REFERENCE TO PRIOR APPLICATION

This application is a divisional application of pending prior U.S. patent application Ser. No. 14/126,136, filed Dec. 18, 2013, now U.S. Pat. No. 9,375,116, which is the National Stage of PCT International Application No. PCT/EP2012/061522 filed on Jun. 15, 2012, which claims priority to French Patent Application No. 11 55244 filed on Jun. 15, 2011, which are all herein incorporated by reference in their entirety.

TECHNICAL FIELD

The present disclosure relates to the field of absorbent paper products intended for wiping, in particular for domestic use.

BACKGROUND

Wiping paper is made with paper fibres and incorporates various additives including, in particular, an additive which increases its wet strength. This type of additive, which will be referred to below as a wet strength additive, forms a network through the sheet which does not affect the paper fibres' capacity to absorb liquid, whilst replacing the inter-fibre links forming the paper which are broken in the presence of water.

The fibrous and chemical composition and the structure of a paper product intended for wiping are adapted accordingly. Compared with a similar product intended for hygienic use, for example, it should have both greater tear resistance and a greater capacity to absorb liquid.

Wiping paper therefore incorporates, in chemical terms, an agent which gives it wet strength and is structured so as to absorb a maximum quantity of liquid, in particular water. To achieve this, according to prior attempts, two or more plies of embossed paper are generally combined. The embossed patterns and the deformation that they impart are selected to create the largest possible thickness whilst limiting the loss of mechanical strength caused by the embossing and resulting from the breaking of inter-fibre links along the zones which are subjected to the embossing stresses. The paper is generally creped to give it the extendability required for the embossing.

There are essentially two ways in which the plies can be assembled. The point-to-point combining method is obtained by embossing protuberances on each of the plies, separately, in the same pattern, followed by facing the protuberances of the two plies and gluing together their tops which are in contact one another. In the so-called "nested" assembly method, the two plies to be joined are embossed with protuberances that have patterns selected so that the protuberances of one ply are nested with those of the other ply, the join being made by gluing the tops of one ply to the bottom of the pattern of the other ply. With these combining methods, the absorption is thus improved compared with the base sheet owing to the spaces formed between the two plies. However, the height of the protuberances is limited by the loss of mechanical strength caused by deep embossing.

Wiping products for domestic use generally take the form of rolls with a continuous sheet in the form of a strip which may be divided into rectangular shapes by transverse pre-cuts and is wound around a core.

SUMMARY

The dimensions of the rolls are now standardized, with a given diameter and width. Given the desired goal of absorption by paper manufacturers, the rolls have a high volume of empty spaces. It would, however, be economically and ecologically advantageous to reduce this volume whilst preserving the properties of the product.

It is desired to produce rolls of wiping paper which are more compact than rolls from the prior art but have a strip of paper of the same length.

It is also desired to produce compact rolls with a sheet of absorbent paper which substantially preserves the same properties as the sheets from the prior art in terms of both absorption and tear resistance or improves the latter.

A solution has been found with a roll of wiping paper obtained by winding a sheet of multi-ply absorbent paper around a core, the sheet including at least a first and a second ply of absorbent paper, each with a grammage of between 15 and 30 g/m² and at least one of the plies incorporating a wet strength additive, the thickness of the sheet Ep being between 0.02 and 0.07 cm, the diameter of the core being less than 3.5 cm, or less than 3 cm, and the diameter of the said roll being between 4.5 cm and 11 cm, or between 4.5 cm and 9.5 cm for a volume V of absorbent paper per unit length of the roll, and the absorbency A of the sheet in grams of water per gram of paper being greater than 6 cm³/g. The roll is characterized in that the ratio E=A/(Ep*V) is greater than or equal to 3.2.

This ratio expresses the fact that there is an optimum absorbency whilst having a reduced volume of paper.

In particular embodiments, the thickness of the sheet is between 0.03 and 0.06 cm and the absorbency less than 16 cm³/g.

In certain embodiments, the sheet has a length of between 8 m and 30 m and the strip forming the sheet is precut along transverse separation lines into successive individual lengths; the number of individual lengths is between 25 and 300 and their length is between 100 and 300 mm.

In certain embodiments, the plies of the sheet have first protuberances directed towards the inside of the sheet and at least 15% of the first protuberances of a ply are nested between the first protuberances of the other ply. The density of the first protuberances is then between 20 and 90, or between 30 and 60.

According to a first embodiment, the roll is formed from a sheet, at least one of the plies of which has a density of at most 0.15 g/cm³, the said ply having first protuberances of the type obtained by moulding on an imprinting fabric of the papermaking machine on which the paper is manufactured.

More particularly, the first protuberances of the plies have a height, relative to the base plane of the ply, of between 40 and 80% of the thickness of the ply and, according to another feature, the spacing in a direction between the first protuberances is at least equal to the largest dimension of the first protuberances in the said direction. The two plies are not calendered and have kept the pre-converting bulk.

The type of paper having such features is advantageously obtained by a non-compressive manufacturing method in which the sheet is dried at least partly by a flow of hot air that is passed through the thickness of the sheet. The sheet, after draining and with a suitable moisture content, is in particular deposited on an imprinting fabric that is woven so that cavities are created on the surface. The sheet is moulded on the fabric and matches the raised marking; the fibres are partly oriented in a direction perpendicular to the plane of the fabric and are displaced relative to one another by the flow of hot air which is directed perpendicularly to the fabric. The air removes at least some of the moisture from the sheet and fixes the fibres in position. When it is detached from the fabric, which is referred to as an imprinting fabric in the industry, the sheet thus has protuberances which correspond to the cavities of the fabric. The bulkiness of the sheet results partly from the drying caused by the flow of air passing through the mass of fibres and partly from the moulding on the imprinting fabric. The geometry of the moulded sheet depends on that of the imprinting fabric.

This means of manufacturing paper is commonly referred to as TAD (through air drying). The sheet obtained by this technique is bulkier than a sheet manufactured using the conventional pressing drying technique known as CWP (conventional wet pressed).

TAD may be combined with another drying method for creping the sheet. While still wet, the sheet is stuck onto a so-called Yankee drying roll and is then removed using a suitable blade.

According to another embodiment, the sheet is obtained from two embossed plies obtained using the conventional so-called CWP technique.

According to another feature, the plies are joined together, in particular by gluing, along joining zones, the said joining zones having a reduced thickness compared with that of the sheet and forming a cavity on each of the two faces of the sheet. In other words, the zones do not form any surface unevenness; they do not protrude from the surface of the sheet. The join enables the plies to be held nested in each other and stabilizes the two-ply sheet. The joined zones are thin compared with the unjoined zones. They do not make the sheet thicker. In order to ensure that the two assembled plies cohere together properly, the joining zones are evenly distributed on the surface of the sheet. They do, however, take up less than 15% of the surface area of the sheet, 0.2% to 7%, or 3% to 6%.

According to one feature, the absorption efficiency, equivalent to the ratio of the absorbency, measured in $cm^3$ of water absorbed per gram of paper, to the density, measured in $cm^3$ per gram, is greater than one. This is a noteworthy property of the sheet which distinguishes it from conventional embossed products. Attempts have indeed been made in the prior art to increase the thickness of the paper sheet by means of embossing in order to improve absorption. The expression of an absorption efficiency greater than one indicates that the embossing of the plies is limited to the joining together of the plies and that the thickness of the sheet has been reduced. Surprisingly, such a sheet has a reduced thickness which allows it to be wound into a roll with a smaller diameter than rolls from the prior art, with the same fibrous and chemical composition, and at the same time preserves the overall absorption properties. Only a slight reduction in absorbency, of about 5%, is observed in comparison with the base sheet. Furthermore, given that the paper is not embossed at all or less embossed than an equivalent product in terms of fibrous and chemical composition from the prior art, the mechanical tear resistance properties are improved. The improvement for each of the plies results from the joining together of the plies.

The paper thus makes it possible to produce compact rolls. This compactness is expressed by measuring the softness of the roll. In this case, it is less than 35, which is greater than that of rolls formed from very tightly wound strips and with no core, which are much less soft.

Also disclosed is a method for manufacturing a roll from a sheet obtained as follows:

Two strips of paper are provided, one for each of the said two plies, the two strips being arranged relative to each other so that the first protuberances face the other strip;

The first strip is embossed on an embossing roll with teeth by applying a rubber roll; after embossing, the height of the projecting part forming the raised marking is less than the thickness of the strip of paper;

An adhesive is applied to the raised marking obtained on the first strip;

The second strip is placed on the first strip whilst the first strip is being held on the embossing roll, and a marrying roll applied to the whole joins the two strips together; the manufacturing method is characterized in that, on the one hand, the pressure applied by the rubber roll and, on the other hand, the pressure applied by the marrying roll allow two strips to be joined together along the glued zones without protuberances being formed on the face of the sheet against which the marrying cylinder is applied. For TAD, the two strips are typically not converted by calendering or another equivalent converting after the paper was manufactured on the papermaking machine.

According to a first method for obtaining the sheet, the two strips are TAD paper.

According to another method for obtaining the sheet, one strip, such as the first strip, is TAD paper and the other strip is CWP-type paper, the first protuberances of which are obtained by embossing.

According to yet another method for obtaining the sheet, the two strips of paper are CWP-type paper and the first protuberances for the two strips are obtained by embossing.

BRIEF DESCRIPTION OF THE DRAWINGS

Embodiments of the invention are described in more detail with reference to the attached drawings, in which.

DETAILED DESCRIPTION OF PREFERRED EMBODIMENTS

Embodiment with a TAD-Type Sheet of Paper

Figure 1:
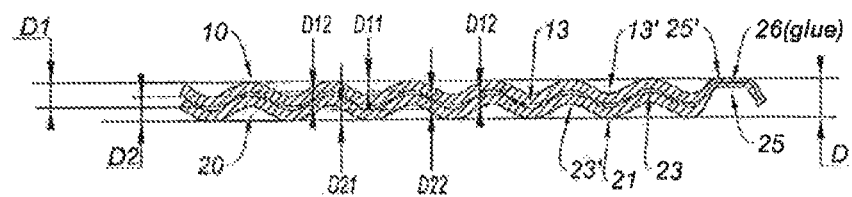
FIG. 1 shows a schematic view in cross-section of a sheet for producing a roll.

FIG. 1 shows a schematic view in cross-section of a sheet 1 for producing a roll, the thickness being shown on a different scale from the width. It consists of two plies 10 and 20 of high-quality absorbent paper intended for wiping. In this embodiment, the paper is of the TAD type.

The paper contains a wet strength additive such as a PAE resin (polyamide epichlorohydrin).

On its face turned towards the inside of the sheet, each ply has unevenness in the form of separate protuberances, first protuberances 13 and 23, which extend in a direction perpendicular to the base of the sheet, the base having the reference numerals 11 and 21, respectively. These protuberances correspond with cavities on the opposite face 13' and 23'. This raised marking is obtained on the papermaking machine when the sheet, after it has been formed and drained and downstream from the headbox, is deposited onto a so-called imprinting fabric which has recessed zones. The dry content of the sheet at this stage is between 15% and 30%. The three-dimensional structure of the imprinting surface results from an appropriate weaving of the threads of the imprinting fabric. The paper fibres deposited on this fabric, if they are not still joined together, are displaced by the flow of air passing through them and some of them assume an orientation which has a radial component; the shaping of the sheet to the raised marking of the fabric is fixed by drying. The dry content of the sheet when removed from the imprinting fabric is about 80%. In the present example, the imprinting fabric is commonly used to manufacture tissue paper. The fabric is chosen such that the density of the protuberances obtained on the sheet is between 20 and 90 protuberances, or between 30 and 60.

The pattern of the first protuberances 13 and 23 on the two plies allows them to be nested. The top of a first protuberance on a ply fits between the first protuberances on the other ply. The protuberances are nested at least partially inside one another, at least 15% of them but possibly as many as 40% depending on the imprinting pattern. The remaining protuberances are crushed by the marrying roll. This nesting results in a thickness D of the sheet which is less than the sum of the thicknesses D1 and D2 of each of the plies. It may be observed that the thickness D1 of the ply 10 is equal to the thickness d11 of the fibrous mass of the base 11 plus the height d12 of the first protuberances 12. The same is true for the thickness of the ply 20: D2=d21+d22. The protuberances of the two plies can be identical but also where the protuberances result from markings on different imprinting fabrics. d11 can thus be equal to or different from d12, and d21 can be equal to or different from d22.

Method for Measuring the Protuberance Heights.

The height of the protuberances is defined by the height measured between the surface of the ply at the base of the protuberances and the top of the latter. The method for measuring the difference in height of the protuberances is defined below:

Commercially available equipment is used which is adapted for carrying out surface measurements of three-dimensional objects. It includes a device for measuring the surface (marketed under the name Optotop/mpe III), a three-dimensional imaging programme (marketed under the name Optocat) and an image analysis programme (marketed under the name Toposurf).

The samples are placed with the "rough" side facing the light from the 3D analyser so that the inner ply of the sheet can be examined. Each sample is flattened as much as possible to prevent interfering differences in heights from being measured. The surface analysed is a rectangle 20×16 mm. Light fringes are projected onto the surface. The fringes are projected at the same frequency but they are phase-shifted by $\pi/2$ from one pass to the next. The fringes are deformed on the surface of the 3D object. The height of each of the points of the surface of the object can be calculated by analysing the deformation. A sinusoidal signal is obtained which is processed by the Optocat program. The image is acquired by triangulation between the fringe projector P, the sheet and the digital camera.

The images are then processed by the Toposurf program. The image is first flattened to compensate for the optical deformations caused by the lens of the camera and then clipped to remove the extreme values (99.9% of data is preserved). A reference image is then obtained. Each pixel of the image is referenced in space and has values in the three axes.

The reference images are then processed using the 'Extract a profile' function. This function allows a line to be drawn on the reference image and a 2D height profile to be created using the straight line that was drawn. This profile is then extracted and a difference between the mean z of the upper points and the mean z of the lower points is calculated.

On the sheet manufactured with the abovementioned imprinting fabric, the difference in height measured using this method is 0.186 mm+/−0.023 mm.

To measure the depth of the recesses on the "soft" side of the ply, this method gives a difference in height of 0.180 mm+/−0.021 mm.

Method for Measuring Thicknesses

In the present application, the thicknesses of a ply or the sheet are defined and measured as follows:

A stack of twelve product samples is arranged on a stationary plate, a feeler in the form of a rectangular plate with a 10 cm$^2$ surface area is mounted on a sliding rod which can move perpendicularly relative to the stationary plate; the feeler is lowered onto the top of the stack at a speed of 2 mm/s and then applies a pressure of 20 g/cm$^2$ to the sheet. The value of the distance separating the two plates is measured after 5 seconds. The thickness is one-twelfth of the measured value.

According to another feature, the two plies of absorbent paper are joined together along joining zones 25'; the two plies can be joined together by a film of glue 26 such as a PVA glue. One of the two plies, 20 in this case, has second protuberances 25 formed by embossing. The height of these protuberances is less than the thickness D of the sheet 1 and does not form any unevenness on the opposite face of the sheet. In fact, in the joining zones the sheet has a first cavity next to the protuberance on the ply 20 and a shallower cavity on the opposite face. The depth of the cavity on the opposite face can be flattened, as shown in FIG. 1.

The sheet is crushed in the joining zones. This reduction in thickness results from the manufacturing process, as will be seen when it is described below.

Figure 2:
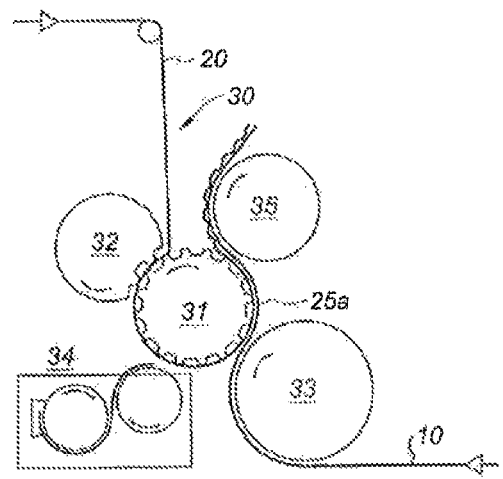
FIG. 2 shows diagrammatically an installation which is capable of manufacturing a sheet.

A means of combining the two plies is illustrated in FIG. 2. The method employs an embossing unit 30 including an engraved roll 31, a roll made of elastomeric material 32 interacting with the engraved roll 31 for embossing the strip of paper between the engraved roll and the elastomeric roll 32, a deflecting roll 33 parallel with the engraved roll, a glue applicator 34 with an applicator roll interacting with the engraved roll, and a marrying roll 35 interacting with the engraved roll. The engraved roll is provided with teeth 25$a$ forming a pattern that corresponds to the pattern of the joining zones that it is desired to form on the absorbent sheet of paper.

The method is as follows: two strips of absorbent paper 10 and 20 intended to form the plies of the sheet are guided, for example, from respective jumbo reels. The strip 20 passes between the engraved roll 31 and the elastomeric roll 32 where it is embossed with the pattern of the protrusions 25$a$; the embossing pressure is sufficient to emboss the second protuberances 25 on the strip 20 but the pressure remains sufficiently low that the second protuberances 25 are barely higher than the first protuberances. It should be noted that the strip 20 is arranged in such a way that the first protuberances 23 are on the same side as the second protuberances 25 of the engraved roll; the strip 20 passes in front of the glue applicator 34 which applies a film of glue to the tops of the second protuberances 25. The strip 10 is guided around the deflecting roll 33 and placed on the strip 20. The first protuberances 13 face the first protuberances 23 of the strip 20. The whole is guided towards the marrying roll 35 which is made from a hard material. The hardness of the marrying roll prevents the embossing of the two-ply sheet. The sole purpose of the pressure exerted by the marrying roll is to join together the two strips by the film of glue on the second protuberances. When the strip 10 comes into contact with the strip 20, at least some of the first protuberances 13 of the strip 10 are positioned between the protuberances 23 of the strip 20 so that they are nested between one another. Downstream from the marrying roll, the two-ply sheet obtained has the structure shown in FIG. 1.

The two-ply sheet is then guided towards a rolling-up station. The sheet, which is wide, is first precut by a toothed blade acting crosswise at regular intervals to form the tabs that join together two successive individual lengths. The sheet is wound around a cardboard core over a length corresponding to the desired number of individual lengths. Because the two-ply sheet is thin, the sheet does not need to be pulled tightly to obtain a compact roll.

Once the roll has been wound, blades cut the roll into shorter rolls which are then packaged, ready to be put on the market. The roll obtained is compact and has the same length of paper strip as a standard roll. It allows savings in terms of logistics, taking up less space during transport and storage especially.

Exemplary Embodiment with a Sheet of TAD Paper

Base Sheet

Absorbent paper was manufactured by the TAD technique using an imprinting shaping fabric. The paper intended for domestic use for wiping incorporates various additives, including a PAE-type wet strength additive.

Figure 4:
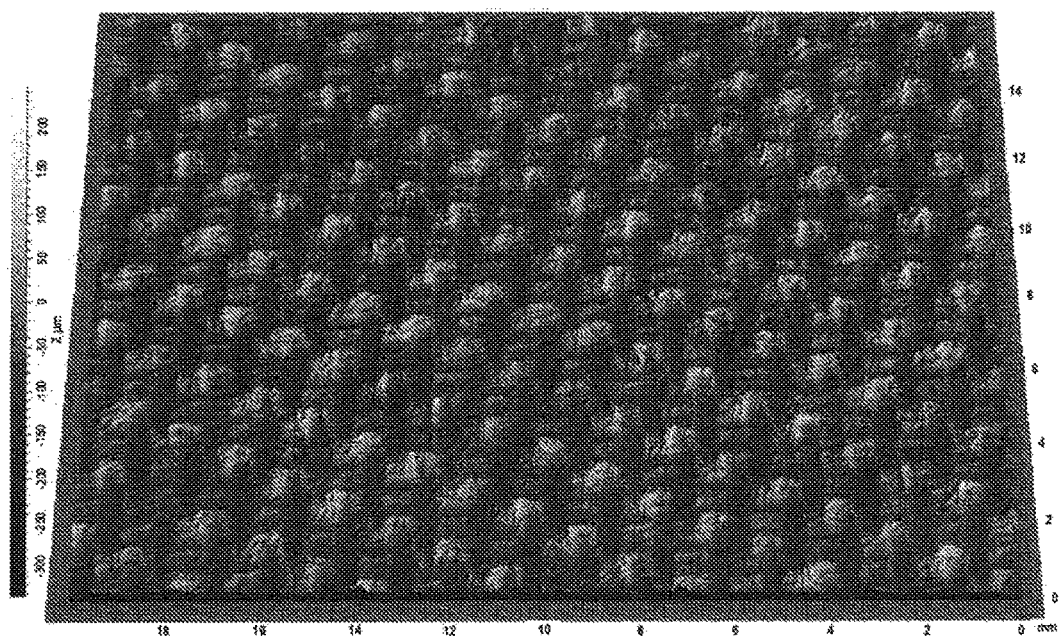
FIG. 4 is a photograph of a ply of the sheet in FIG. 3, seen from its rough side.
Figure 5:
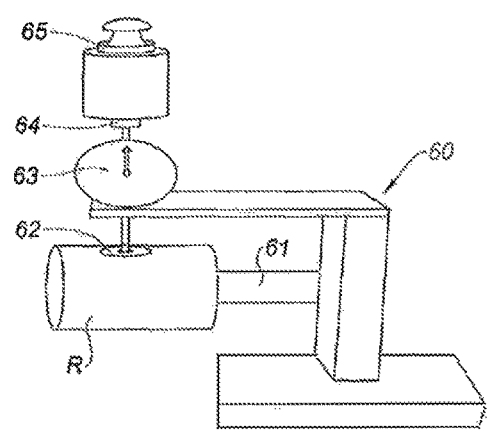
FIG. 5 shows a softness measuring device.

FIG. 4 shows a digitized image of the inner face of the two plies which has been greyscaled: dark grey for the shortest zones and light grey for the highest zones. It will be noted that the protuberances are separate zones regularly distributed on the surface of the sheet.

It has the following features:
Density: 0.0695 g/cm$^3$, which is the ratio of mass per unit area to thickness;
Mass per unit area: 21.7 g/m$^2$;
Sheet thickness: 0.312 mm;
Density of the first protuberances (shaping fabric): 45+/−5 per cm$^2$;
Height of the protuberances: 0.200 mm+/−0.021;
Density of the protuberances per unit area: 0.436 cm$^2$/cm$^2$; and
Average surface area of the protuberances: 0.00458 cm$^2$.

The base sheet produced by the papermaking machine was processed using the method of an embodiment of the invention to obtain a two-ply sheet.
Density of the two-ply sheet: 0.09 g/cm$^3$
Thickness of the two-ply sheet (finished product): 0.47 mm
The characteristics of each ply after assembly are:
Average thickness of the plies: 0.297 mm,
Density of the protuberances (shaping fabric): 45+/−5 per cm$^2$,
Height of the protuberances: 0.186 mm+/−0.023,
Density of the protuberances per unit area: 0.216 cm$^2$/cm$^2$, and
Average surface area of the protuberances: 0.00227 cm$^2$.

For the embossed ply, corresponding to the ply 20 in FIG. 1, the difference in height, measured between the top of the second protuberances 25 of the tissue paper and the first protuberances 23 is 0.019 mm. It can thus be confirmed that the top of the joining zones does not protrude from the surface of the sheet.

It will be noted that the average thickness of the two-ply sheet is much less than the sum of the average thicknesses of each of the two plies.

Comparative measurements of absorption were carried out on a product obtained in this way and a product from the prior art which is marketed by the present Applicant under the brand Okay, both on products manufactured on a pilot line and on products manufactured on an industrial line.

1) Products Made on the Same Pilot Line (Same Embossed Patterns, Same Recipes: Fibrous and Chemical Compositions):

Strength measurements were carried out on the product in accordance with standards EN 12625-4 (dry strength) and EN 12625-5 (wet strength).

Measurements of absorption were carried out in accordance with the standard EN 12625-8.

|  | OKAY | Inventive Example |
|---|---|---|
| Grammage (g/cm$^2$) | 0.00428 | 0.00426 |
| Thickness (cm) | 0.072 | 0.047 |
| Dry strength machine direction MD (N/m) | 389 | 492 |
| Dry strength cross direction CD (N/m) | 319 | 464 |
| Wet strength machine direction MD (N/m) | 105 | 139 |
| Wet strength cross direction CD (N/m) | 88 | 126 |
| Theoretical density (cm$^3$/g) | 16.82 | 11.03 |
| Water absorbency (cm$^3$/g) | 13.5 | 12.3 |
| Absorption efficiency | 80% (−24% vs tissue) | 111% (+7% vs tissue) |

2) Products Made on an Industrial Line:

|  | OKAY | Inventive Example |
|---|---|---|
| Grammage (g/cm$^2$) | 0.004232 | 0.00434 |
| Thickness (cm) | 0.0804 | 0.051 |
| Dry strength machine direction MD (N/m) | 375 | 581 |
| Dry strength cross direction CD (N/m) | 245 | 409 |
| Wet strength cross direction CD (N/m) | 70 | 104 |
| Theoretical density (cm$^3$/g) | 19 | 11.08 |
| Water absorbency (water - cm$^3$/g) | 14.6 | 11.75 |
| Absorption efficiency | 77% (−20% vs tissue) | 106% (+9% vs tissue) |

It will be noted that in both cases the absorption efficiency, the ratio of absorbency to density, is higher for the product of the inventive example. The embossing pattern has no effect.

Figure 3:
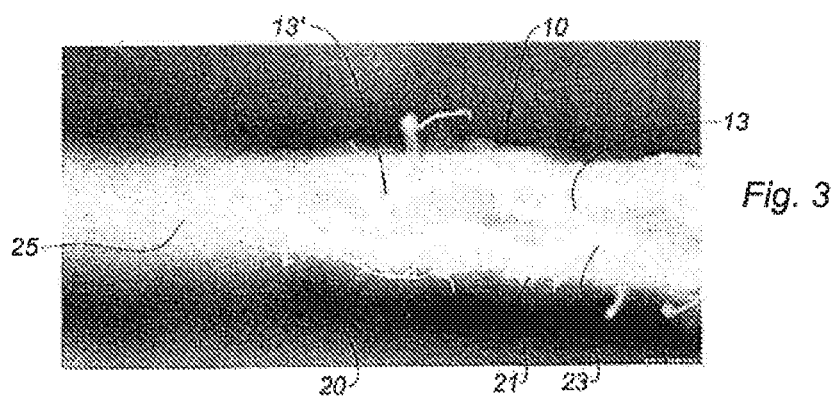
FIG. 3 is a photograph of a sheet, in an exemplary embodiment, seen in cross-section.

FIG. 3 shows a photograph of a cross-section of the sheet, enlarged 10 times. It will be noted that the majority of the first protuberances 13 and 23 are nested inside one another. For a portion of the surface of the plies, the first protuberances cannot be nested perfectly.

The two plies are joined along a thin joining zone 25'. The joining zone does not project from either side of the sheet; cavities are present on each of the faces of the sheet, along the join 25'.

It will also be observed that the two plies tend to move apart from each other owing to the resilience of the paper. The join thus makes it possible to keep the two plies in position relative to one another. It is sufficient for the glued surface to be less than 15% or between 0.2 and 7%.

Rolls of paper were manufactured by winding sheets of paper assembled in this way around a core with a diameter of 27 mm. The winding was carried out with only as much traction being exerted on the sheet as is necessary to wind it on without tightening it.

The characteristics of the roll obtained in this example, compared with a roll from the prior art marketed by the present Applicant under the brand Okay.

|  | Okay | Inventive Example |
| --- | --- | --- |
| Sheet length (mm) | 235 | 235 |
| Roll height (mm) | 230 | 230 |
| Number of sheets | 43 | 43 |
| Diameter (mm) | 106 | 77 |
| Required space (cm$^2$) | 88 | 47 |
| Number of rolls per m$^2$ | 113 | 214 |
| Ratio of number of rolls versus Okay | 100% | 189% |
| Volume of roll (cm$^3$) | 2030 | 1071 |
| Ratio of volume versus Okay | 100% | 53% |

The softness of the roll after formation was measured.

Measuring the softness or hardness, with reference to FIG. 6, consists in sliding the roll R over the rod 61 which is mounted on a rigid support 60, is horizontal and is in the form of a spindle.

A feeler 62 in the form of a disc with a 30 mm diameter is arranged on the roll, at the centre of the width. A gauge 63, in this case a ROCH one, is installed and the needle is zeroed; with this gauge one revolution of the needle corresponds to 1 mm of displacement. A 1 kg weight 65 is placed on the tray 64 of the gauge. The amplitude of the degree to which the roll is crushed is noted (two measurements are made on the circumference of the roll). The softness or hardness is the average of the two measurements expressed in tenths of millimeters.

Thus, for the inventive example of rolls obtained according to the invention, the softness measured is 20. By way of comparison, the softness of a product sold by the Applicant under the Okay brand is 90.

OTHER EMBODIMENTS

Also part of the invention is the production of a roll with a sheet of paper with plies which are pieces of paper obtained using a conventional CWP-type manufacturing technique with compression of the sheet and then drying on a Yankee drying roll, as well as creping. Each ply includes an embossed pattern with a protuberance pattern, known as micro-embossing, consisting of separate protuberances with an overall frustoconical or pyramid shape. The density of the protuberances is then greater than 30 per cm$^2$.

In order to manufacture such a sheet, the installation in FIG. 2 is modified by providing embossing rolls. For example, the roll can be an engraved roll with two patterns at different levels, enabling simultaneous embossing on the ply of the two patterns of the first and second protuberances.

According to another embodiment, the sheet used is a hybrid sheet with a ply of TAD paper as described above and a sheet of CWP paper on top of it.

Rolls with a 7.7 diameter on a cardboard core with a 2.7 cm diameter are manufactured. The quantity of paper wound onto the core to form the roll had a volume V of 41 cm$^3$ per unit length of the roll in cm.

The ratio E was calculated for three embodiments; a TAD sheet, a hybrid sheet and a CWP sheet, all three with a thickness Ep of 0.05 cm, and with an absorbency A as in the table below. To calculate E, the value of A is divided by the thickness Ep of the sheet and then by the volume V of paper on the roll per unit length. The calculated values of the ratio E are indicated in the table. It will be noted that it is greater than 3.2.

The same calculation was carried out for a commercially available product Okay made by the present Applicant and it was confirmed that the ratio E was less than 3.2 (see table).

|  | Roll diameter (cm) | Core diameter (cm) | Tissue/roll volume ex core (cm3) V | Grammage (g/m2) | Thickness (cm) Ep | Absorption (cm3/g) A | E |
| --- | --- | --- | --- | --- | --- | --- | --- |
| Inventive Example TAD 2-ply | 7.7 | 2.7 | 41 | 42.6 | 0.05 | 12.3 | 6.0 |
| Inventive Example hybrid | 7.7 | 2.7 | 41 | 40.9 | 0.05 | 11.6 | 5.7 |
| Inventive Example CWP 2-ply | 7.7 | 2.7 | 41 | 35 | 0.05 | 7.5 | 3.4 |
| Okay | 10.6 | 4.3 | 74 | 42.32 | 0.0804 | 14.6 | 2.5 |

The invention claimed is:

1. A method for manufacturing a sheet forming a roll of wiping paper comprising the following steps:

a. providing first and second strips of paper, each strip having first protuberances, the first and second strips being arranged relative to each other so that (i) the first protuberances of the first strip face the first protuberances of the second strip and (ii) all the first protuberances of the first strip are aligned with corresponding cavities in the second strip, a shape of the first protuberances of the first strip being substantially the same as a shape of the first protuberances of the second strip, b. embossing the first strip on an embossing roll which has protrusions by applying a rubber roll to form a raised marking on the first strip, the raised marking being formed on a same side of the first strip as the first protuberances of the first strip, c. applying an adhesive to the raised marking formed on the first strip, d. placing the second strip directly on the first strip whilst the first strip is being held on the embossing roll, and e. applying a marrying roll to the first and second strips to directly join the first and second strips together along glued joining zones corresponding to the raised marking formed on the first strip, wherein the pressure applied by the rubber roll and the pressure applied by the marrying roll allow the first and second strips to be joined together along the glued joining zones without protuberances being formed on the face of the sheet against which the marrying roll is applied.

2. The method of claim 1, wherein a height of the raised marking on the first strip is less than a thickness of the sheet such that the glued joining zones do not form any unevenness on a surface of the sheet.

3. The method of claim 1, wherein the glued joining zones take up less than 15% of the surface area of the sheet.

4. The method of claim 1, wherein a thickness of the glued joining zones is less than a thickness of the sheet.

5. The method of claim 1, wherein when the first strip comes into contact with the second strip, at least some of the first protuberances of the first strip are nested between the first protuberances of the second strip.

6. The method of claim 5, wherein when the first strip comes into contact with the second strip, at least 15% of the first protuberances of the first strip are nested between the first protuberances of the second strip.

7. The method of claim 1, wherein at least one of the first strip and the second strip has a grammage of between 15 and 30 $g/m^2$.

8. The method of claim 1, wherein at least one of the first strip and the second strip incorporates a wet strength additive.

9. The method of claim 1, wherein the sheet has a thickness between 0.02 and 0.07 cm.

10. The method of claim 1, wherein the sheet has a thickness between 0.03 and 0.06 cm.

11. The method of claim 1, wherein an absorbency of the sheet in $cm^3$ of water per gram of paper is greater than 6 $cm^3/g$.

12. The method of claim 1, wherein an absorbency of the sheet in $cm^3$ of water per gram of paper is less than 16 $cm^3/g$.

* * * * *